United States Patent [19]

Domenget et al.

[11] Patent Number: 4,816,978
[45] Date of Patent: Mar. 28, 1989

[54] ELECTRICAL POWER SUPPLY CIRCUIT, IN PARTICULAR FOR A WAVE GENERATOR FOR A PULSE RADAR

[75] Inventors: Jean-Pierre Domenget, Garches; Gérard Lorec, Bourg-la-Reine, both of France

[73] Assignee: Electronique Serge Dassault, Saint Cloud, France

[21] Appl. No.: 150,111

[22] Filed: Jan. 29, 1988

[30] Foreign Application Priority Data

Jul. 31, 1987 [FR] France ................. 87 10922

[51] Int. Cl.$^4$ ........................... H02M 3/335
[52] U.S. Cl. ........................... 363/21; 363/61; 363/65; 323/272
[58] Field of Search ............. 363/20, 21, 59–61, 363/65, 68, 71; 323/271, 272, 346

[56] References Cited

U.S. PATENT DOCUMENTS

| | | | |
|---|---|---|---|
| 4,062,057 | 12/1977 | Perkins et al. | 363/71 |
| 4,175,249 | 11/1979 | Gruber | 323/271 |
| 4,513,361 | 4/1985 | Rensink | 363/61 |
| 4,695,935 | 9/1987 | Oen et al. | 323/272 |

Primary Examiner—Peter S. Wong
Attorney, Agent, or Firm—Pollock, Vande Sande & Priddy

[57] ABSTRACT

An electrical power supply circuit, in particular for a pulse radar wave generator, includes a chopper regulation circuit and a transformer which is fed from a low voltage source. The primary winding of the transformer of the circuit has a plurality of primary windings wound on a common transformer core. Each of the primary windings is connected to the low voltage source via an electronic power switch controlled by a voltage regulation signal at the repetition frequency of the radar pulses or at a multiple of the frequency. The transformer secondary includes a plurality of secondary circuits with their outputs connected in series between the very high voltage output terminals of the power supply circuit as a whole. Each secondary circuit includes a secondary winding wound on the common transformer core and connected in series with a rectifier connected to oppose the voltage induced by the primary current, together with a filter capacitor connected in parallel with the series circuit consituted by each secondary winding and each rectifier.

6 Claims, 2 Drawing Sheets

ELECTRICAL POWER SUPPLY CIRCUIT, IN PARTICULAR FOR A WAVE GENERATOR FOR A PULSE RADAR

FIELD OF THE INVENTION

The invention relates to an electrical power supply circuit, and more particularly to power supply circuits that are required to operate at high frequency.

The invention provides a stabilized power supply for radar, and in particular for a travelling wave tube or microwave generator in pulse radars. It is particularly intended for radars mounted on vehicles, such as aircraft or other aero-space craft for which considerations of bulk and of weight are paramount and which are intended to operate under different environmental conditions.

BACKGROUND OF THE INVENTION

The present Assignee's French patent application No. 82 08 516 filed May 14, 1982 (U.S. Ser. No. 946,801) describes a power supply circuit for a wave generator in a pulse radar comprising a primary winding connected, in series with an electronic power switch, to the terminals of a filtered and rectified on board voltage source, said switch being controlled at the recurrence frequency of the pulses produced by the radar or at a frequency which is a multiple thereof. The primary winding is wound about a magnetic component core having a plurality of secondary windings wound thereon, with each secondary winding being connected in series with a diode and filter capacitor. These capacitors are themselves connected in series.

A plurality of transformers of this type may be stacked in series, with additional capacitors being connected in parallel with the series circuit formed by each primary winding in order to sum the secondary voltages from each transformer at the very high tension output terminals of the power supply.

Unfortunately, connecting such transformers in series in order to power the various electrodes of a microwave tube, which electrodes consume different powers, would require the power seen from the primary of each transformer to be different from one transformer to another, thereby unbalancing the loads seen by the primaries of said transformers and thus preventing the circuit from operating properly.

In French patent application No. 86 14336 filed Oct. 15, 1986, (U.S. Ser. No. 07/076,356) the Assignee has also proposed a high frequency power supply including a voltage source connected via a power switch to two primary windings which are connected in parallel and which are magnetically coupled with a magnetic circuit which is generally rectangular in shape. Pairs of secondary windings are printed on insulating substrates which are separated by insulating inserts, and have the cores of the magnetic circuit passing perpendicularly through the holes of the insulating substrates and inserts.

Such a circuit provides excellent electrical performance, is as compact as possible, and is easily manufactured industrially. However, putting a plurality of transformers of this type is series in order to power the electrodes of a microwave tube which consume different powers inevitably leads to an unbalance between the loads seen by the primaries of said transformers.

The aim of the invention is to provide a solution to this problem, by providing a circuit enabling a plurality of microwave tube electrodes consuming different powers to be powered with very high voltage without giving rise to unbalance in the loads seen by the circuit primary.

SUMMARY OF THE INVENTION

The invention provides an electrical power supply circuit, in particular for a pulse radar wave generator, the circuit being of the type including a chopper regulation circuit and a transformer which is fed from a low voltage DC source.

According to a general definition of the invention, the primary winding of the transformer comprises a plurality of primary windings wound on a common transformer core and each connected to the low voltage source via a respective electronic power switch controlled by a voltage regulation signal at the repetition frequency of the radar pulses or at a multiple of said frequency, and the transformer secondary comprises a plurality of secondary circuits with their outputs connected in series between the very high voltage output terminals of the power supply circuit as a whole, with each secondary circuit comprising a secondary winding wound on the said common transformer core and connected in series with a rectifier connected to oppose the voltage induced by the primary current, together with a filter capacitor connected in parallel with the series circuit constituted by each secondary winding and each rectifier.

More particularly, the plurality of primary winding is split up into a plurality of horizontal primary stages connected in series between the low voltage input terminals together with a capacitor connected in parallel with the series circuit constituted by each primary stage, with the control grids of the electronic power switches within each primary stage being interconnected and controlled by the same regulation signal.

A stabilized power supply made in this way in accordance with the invention includes a transformer comprising a plurality of primary windings and a plurality of secondary windings wound around a common magnetic circuit. The loads seen by the primary windings of the transformer are identical even when powering microwave tube electrodes consuming different powers, thereby balancing the powers which pass through the power switches that connect the primary windings to the low voltage source.

Advantageously, the electronic switches are switched in-phase.

Advantageously, the electronic power switches are VMOS type field effect transistors.

BRIEF DESCRIPTION OF THE DRAWINGS

An embodiment of the invention is described, by way of example with reference to the accompanying drawings, in which.

In many respects the accompanying drawings include items which are definitive in nature. The drawings may therefore serve not only to clarify the following description, but may also contribute to defining the invention, where appropriate.

DETAILED DESCRIPTION OF THE INVENTION

Figure 1:
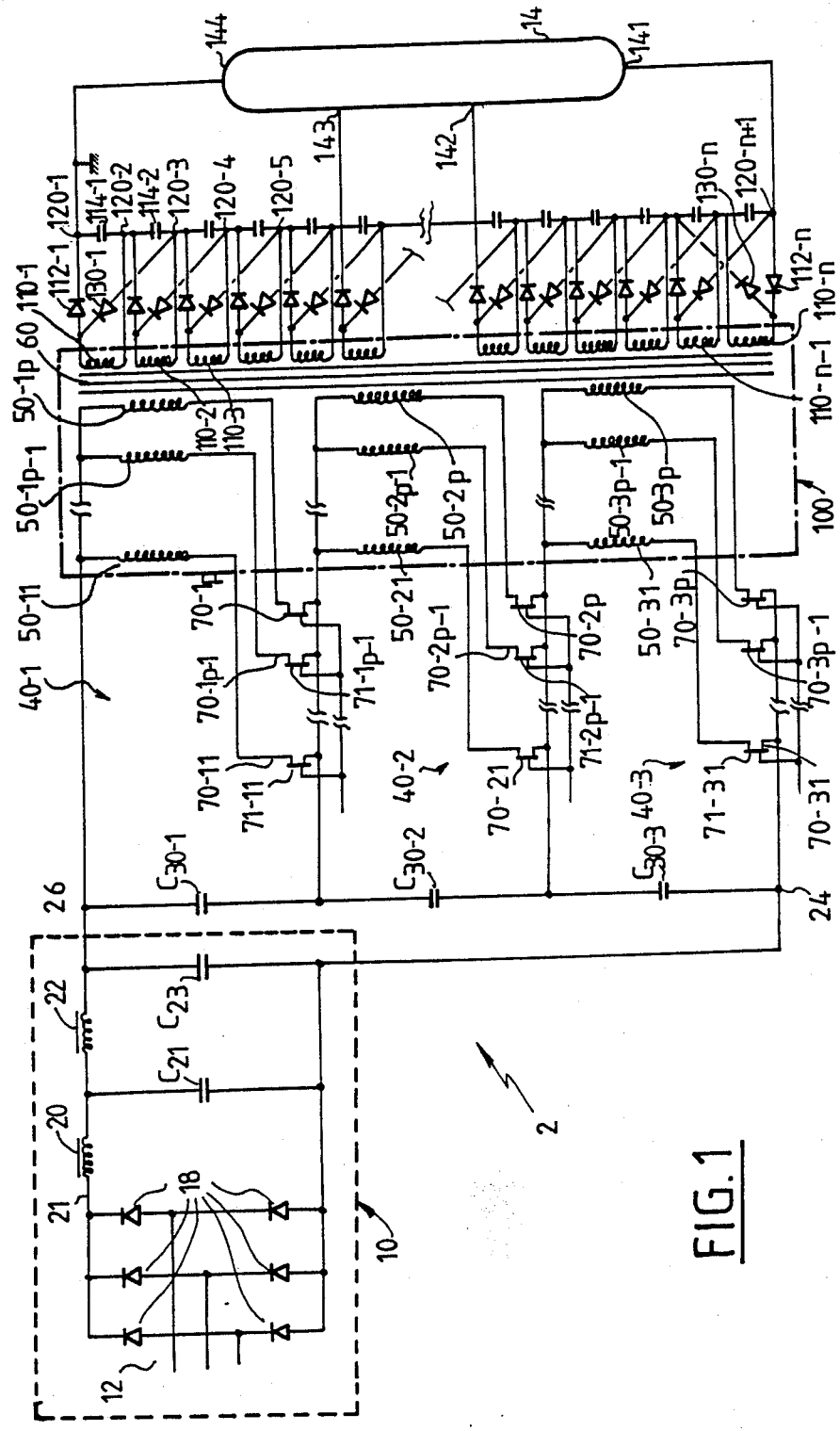
FIG. 1 is a diagram of the essential component parts of a circuit in accordance with the invention.

In FIG. 1, reference 2 designates an electrical power supply circuit in accordance with the invention. The circuit 2 comprises a conventional power supply 10 connected to a source 12 of voltage (E) for powering a radar travelling wave tube 14. The signals from the source 12 are derived from the three phase network on board an aircraft, after suitable rectification by a set of diodes such as 18 in order to provide a rectified voltage between two input terminals 20 and 21 of the power supply 10. The rectified voltage is filtered by a first filter cell comprising a choke L20 and a capacitor C21 followed by a second filter cell comprising a choke L22 and a capacitor C23. In equipment on board an aircraft, the source 12 may be at a frequency of 400 Hz, for example, and the rectified voltage available between terminals 20 and 21 may have a nominal value of about 270 volts, but is subject to fluctuations in the range 130 volts to 420 volts RMS.

The filter cells L20-C21 and L22-C23 cause a D.C. voltage to appear between terminals 24 and 26. This D.C. voltage could be generated by any other conventional D.C. source.

Three capacitors C30-1, C30-2, and C30-3 are connected in series between the terminals 24 and 26, and each of said capacitors has a respective corresponding primary circuit 40 (having respective references 40-1, 40-2, 40-3) connected across its terminals. Naturally, the number of stages could be other than three. Each primary stage 40 comprises p primary windings 50 of a transformer, with all of said primary windings 50 being wound on a common magnetic circuit 60. p may be equal to 12, for example.

Each primary winding is connected to the low voltage souce via an electronic power switch 70 which is controlled by a voltage regulation signal at the radar pulse repetition rate, or at a multiple of said rate. The switches 70 are constituted, for example, by VMOS type field effect power transistors. IRF 450 type transistors as manufactured by International Rectifier, in the United States, are suitable for this application. Such a component is capable of switching currents of up to 10 amps at frequencies of up to 200 kHz to 300 kHz under the control of the voltage applied to its grid 71. Its breakdown voltage may be 500 volts.

Within any one stage 40, the control grid 71 of the electrical power switches 70 are interconnected and are controlled by a common regulation signal of period T as described below. The electronic switches 70 are all controlled in-phase.

In addition to its $3p$ primary windings 50, the high tension transformer 100 has n secondary windings 110 given individual references 110-1 to 110-$n$ wound on the same magnetic circuit 60 and belonging to n secondary circuits. n may be equal to 40, for example. Each secondary winding such as 110-1 is connected to a rectifier diode 112-1 in such a direction that when the switch 70-11 is ON the voltage induced in the winding 110-1 reverse biases the diode 112-1. A capacitor 114-1 is connected in parallel with the circuit constituted by the winding 110-1 and the diode 112-1 between two terminals 120-1 and 120-2 which constitute the output terminals of the secondary circuit constituted in this way. The secondary circuits 1 to n are connected in series such that the resulting voltage which appears between terminals 120-1 and 120-(n+1) is the sum of the D.C. voltages across each of the secondary circuit outputs. Diodes 130 given individual reference numbers 130-1 to 130-$n$ connect one of the plates of the capacitors 114 to the cathodes of diodes 112. For example capacitor plate 114-2 is connected to the cathode of diode 112-1 via diode 130-1. Diode 130-1 thus connects secondary winding 110-1 to secondary winding 110-2. These diodes 130 are intended to protect the diodes 112 against parasitic voltage surges which occur at the moment they become reverse biased.

A travelling wave tube 14 is connected between the terminals 120-1 and 120-(n+1), said tube comprising a cathode 141 connected to terminal 120-(n+1), a first collector 142 connected to one of the output terminals 120, a second collector 143 connected to one of the outputs 120, and a helix 144 connected to output terminal 120-1.

The diodes 112 and 130 are components having very short recovery times enabling them to operate at the same frequency as the VMOS switches 70, said diodes being capable of withstanding high reverse voltages.

The circuit 2 designed in this way is a buck-boost module capable of operating discontinuously or continuously depending on the relative values of the self-inductance of the primary windings 50, on the switching period T of the control grids 71, and on the output power. In the embodiment described herein, "continuous" mode operation is preferred, i.e. operation in which the current within each operating phase of the primary and secondary circuits does not cancel.

Figure 2A:
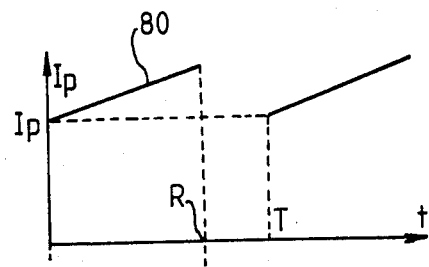
FIGS. 2A and 2B are waveform diagrams showing the current signals flowing through the primary and the secondary windings respectively.
Figure 2B:
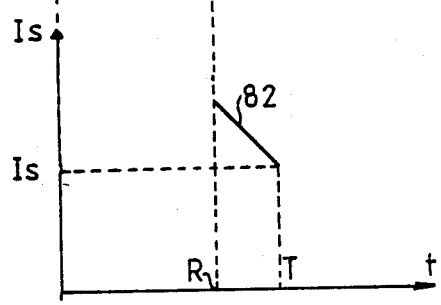
Figure 3:
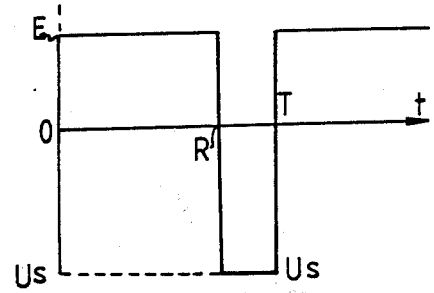
FIG. 3 is a waveform diagram showing the primary and secondary voltages of the FIG. 1 circuit.

Reference is now made to FIGS. 2 and 3 which illustrate the operation of the circuit in accordance with the invention. In operation, when each switch 70 is ON for time R which is less than the switching period T and which is regulated as a function of the output voltage to be obtained, an increasing current Ip flows through each primary winding 50. This current charges the inductance of each primary winding 50. During this time, no current flows in any of the secondary windings 110 by virtue of the direction in which the diodes 112 are connected. When the control signal applied to each gate 71 switches off each switch 70, the current Ip stops. A decreasing current Is then flows through each of the secondary windings 110 starting at said switchover instant R in the conduction direction of the respective diodes 112. This current 82 which corresponds to discharging each inductance 50 is interrupted at instant T when each switch 70 is again switched on (at the end of the control period for the chopper switch).

If the voltages across the terminals of each of the primary windings 50 and of each of the secondary windings 112 are considered (FIG. 3), it can be seen that for the primary windings 50, this voltage remains constant and equal to the voltage (E) of the source 12 during the period R, and then reverses when the switches 70 are switched off. A voltage Us then appears across the various terminals 120 of each output circuit 110, with said voltage signal lasting throughout the period running from instant R to instant T. So long as steps are taken to ensure that the duration R is longer than the duration T−R, and assuming a one-to-one turns ratio, the voltage Us is greater than the voltage E. The voltage appearing between output terminals 120-1 and 120-(n+1) is equal to n.Us. If the voltage Us is 700 volts and the number n is equal to 40, the output voltage from the module 2 under such conditions is about 28,000 volts.

The electrical power supply circuit in accordance with the invention has the following advantages:

very high tension voltages can be generated at an amplitude which is variable by adjusting the number n of secondary stages of voltage Us connected in series;

the output power from said power supply can be increased by adding power switches to the horizontal primary stages;

the electrical power supply circuit can be adapted to different amplitudes of the low voltage E by modifying the number of horizontal primary stages connected in series between the low voltage input terminals;

it is capable on its own of powering all of the electrodes of a travelling wave microwave tube; and it is capable on its own of powering a plurality of travelling wave tubes.

We claim:

1. An electrical power supply circuit for a pulse radar wave generator, comprising:

a pair of DC input terminals for connecting to a direct current low voltage source;

a controlling input for receiving a control signal at the repetition frequency of radar pulses or at a multiple of said frequency;

a plurality of high voltage high power DC terminals for connecting to respective electrodes of said pulse radar wave generator;

a common transformer core;

a first plurality of primary windings, wound on said common transformer core, and arranged in series with a corresponding first plurality of electronic power high frequency switches having respective control electrodes connected to said controlling input;

at least a second plurality of primary windings, wound on said transformer core, and arranged in series with a corresponding second plurality of electronic power high frequency switches having respective control electrodes connected to said controlling input, each of said plurality of primary windings being respectively connected across a capacitor, the respective capacitors being connected in series across said pair of DC input terminals;

a plurality of second windings wound on said transformer core, each of said plurality of secondary windings being connected across a corresponding first rectifier mounted in series with a corresponding capacitor and connected to be conductive when a corresponding electronic power high frequency switch is blocked;

wherein all corresponding capacitors of said plurality of secondary windings are connected in series and define said plurality of high voltage high power DC terminals.

2. A power supply circuit according to claim 1, wherein each of said plurality of secondary windings comprises a corresponding second rectifier connected across its terminal to said corresponding first rectifier and the opposed electrode of the capacitor associated with the adjacent secondary winding.

3. A power supply circuit according to claim 1, further comprising:

at least a third plurality of primary windings, wound on said transformer core, and arranged in series with a corresponding third plurality of electronic power high frequency switches having respective control electrodes connected to said controlling input.

4. A power supply circuit according to claim 1, wherein the electronic power high frequency switches are VMOS type field effect transistors.

5. A power supply circuit according to claim 1, wherein said power supply circuit is a buck-boost module capable of operating discontinuously.

6. A power supply circuit according to claim 1, wherein said power supply circuit is a buck-boost module capable of operating continuously.

* * * * *